United States Patent [19]
Angell et al.

[11] Patent Number: 5,962,169
[45] Date of Patent: Oct. 5, 1999

[54] LITHIUM ION CONDUCTING ELECTROLYTES

[75] Inventors: Charles Austen Angell, Mesa, Ariz.; Changle Liu, Midland, Mich.; Kang Xu, Montgomery Village, Md.; Terje A. Skotheim, Tucson, Ariz.

[73] Assignee: Arizona Board of Regents, Tempe, Ariz.

[21] Appl. No.: 09/122,264

[22] Filed: Jul. 24, 1998

Related U.S. Application Data

[60] Division of application No. 08/471,840, Jun. 6, 1995, Pat. No. 5,786,110, which is a continuation-in-part of application No. 07/901,669, Jun. 22, 1992, Pat. No. 5,506,073.

[51] Int. Cl.⁶ .......................... H01M 10/36; H01M 10/40
[52] U.S. Cl. .......................... 429/309; 429/314; 429/317; 429/199; 429/188
[58] Field of Search .................................... 429/199, 188, 429/309, 314, 317

[56] References Cited

U.S. PATENT DOCUMENTS

| | | |
|---|---|---|
| 3,445,290 | 5/1969 | Elliott et al. . |
| 3,615,828 | 10/1971 | Fischer et al. . |
| 4,164,610 | 8/1979 | Beall et al. . |
| 4,234,667 | 11/1980 | Bennion et al. . |
| 4,303,748 | 12/1981 | Armand et al. . |
| 4,331,744 | 5/1982 | Henk et al. . |
| 4,331,750 | 5/1982 | Malugani et al. . |
| 4,357,401 | 11/1982 | Andre et al. . |
| 4,367,269 | 1/1983 | Nagai et al. . |
| 4,386,020 | 5/1983 | Hartwig et al. . |
| 4,526,855 | 7/1985 | Hartwig et al. . |
| 4,585,714 | 4/1986 | Akridge . |
| 4,737,422 | 4/1988 | Knight et al. . |
| 4,844,995 | 7/1989 | Noda et al. . |
| 5,009,970 | 4/1991 | Kronfli et al. . |
| 5,474,860 | 12/1995 | Abraham et al. . |
| 5,484,670 | 1/1996 | Angell et al. . |
| 5,506,073 | 4/1996 | Angell et al. . |
| 5,786,110 | 7/1998 | Angell et al. . |

FOREIGN PATENT DOCUMENTS

| | | |
|---|---|---|
| 0 083 682 | 7/1983 | European Pat. Off. . |
| 0 130 507 | 1/1985 | European Pat. Off. . |
| 0 379 372 | 7/1990 | European Pat. Off. . |
| 0 421 612 | 4/1991 | European Pat. Off. . |
| 2 456 071 | 1/1981 | France . |
| 110429 | 8/1979 | Japan . |
| 92/1892 | 9/1992 | South Africa . |
| 532916 | 2/1977 | U.S.S.R. . |

OTHER PUBLICATIONS

Cooper et al., 1983 (no month), "Versatile Organic Iodide Melts and Glasses with High Mole Fractions of LiI: Glass Transition Temperatures and Electrical Conductivities," Solid State Ionics, vols. 9 & 10, pp. 617–622.

Koksbang et al., 1990 (no month), "Rechargeability and Rate Capability of Polymer Electrolyte Batteries at Room Temperature," Journal of Power Sources, vol. 32, pp. 175–185.

Takami et al., 1993 (no month), "Secondary Molten–Salt Lithium Batteries," Chemical Abstracts, vol. 118,, 195131d, for Japanese Patent Application (Kokai) No. JP 04–349365; Derwents and JAPIO Patent Abstracts for JP 04–349365.

*Primary Examiner*—John S. Maples
*Attorney, Agent, or Firm*—Morrison & Foerster LLP

[57] ABSTRACT

The present invention relates generally to highly conductive alkali-metal ion non-crystalline electrolyte systems, and more particularly to novel and unique molten (liquid), rubbery, and solid electrolyte systems which are especially well suited for use with high current density electrolytic cells such as primary and secondary batteries.

38 Claims, 7 Drawing Sheets

○ PVSLi
▽ 0.75 mol % PVSLi in 92.5 mol % LiClO₄/LiNO₃

○ 7.5 mol % PVSLi in 92.5 mol %
LiClO$_4$/LiNO$_3$ at R.T.

LITHIUM ION CONDUCTING ELECTROLYTES

This application is a division of U.S. Ser. No. 08/471,840 filed Jun. 6, 1995, now U.S. Pat. No. 5,786,110, which is a continuation-in-part of U.S. Ser. No. 07/901,669, filed Jun. 22, 1992, now U.S. Pat. No. 5,506,073.

The U.S. Government has a paid-up license in this invention and the right in limited circumstances to require the patent owner to license others on reasonable terms as provided for by the terms of DOE Contract Number DE-FG02-89ER4535398 awarded by the Department of Energy.

BACKGROUND OF THE INVENTION

In the search for suitable materials from which to construct high energy density solid state batteries, one of the principal obstacles has been the provision of a suitable electrolyte. A variety of approaches have been tried heretofore. The one which received the most attention among those prior approaches is the one based on polymer solvents in which an optimized amount of ionic salt is dissolved in the polymer solvent (See Armand et al., U.S. Pat. No. 4,303,748; Andre et al., U.S. Pat. No. 4,357,401; and Kronfli et al., U.S. Pat. No. 5,009,970). Other approaches, which possessed both specific advantages and disadvantages, involved glassy solid electrolytes, and certain plastic crystal or disordered crystal electrolytes. Neither of these approaches, nor any of the prior art approaches, obtain all the properties generally required of an electrolyte for the successful development of a high power solid state battery, namely: (1) high ionic conductivity at desired use temperatures preferably between about −20° C. to +100° C. (with conductivities of about $10^{-3}$ S/cm or above at room temperature); (2) conductivity predominately by cations (to avoid undesirable cell polarization problems); (3) a rubbery or viscoelastic consistency (to permit the deformation of the electrolyte as needed to accommodate volume changes during charging and discharging cycles); (4) stability over a wide electrochemical potential range (to permit the utilization of anode/cathode combinations which provide high voltages); and (5) good adherence to the electrode surfaces (to prevent mechanical/electrical problems that could other-wise develop during charging and discharging cycles).

Each substance heretofore developed for solid electrolyte purposes possesses only a limited number of the above-identified desiderata. None achieved them all. For instance, the so-called superionic glass electrolyte, exemplified in the most successful case by $Li_2S$—$LiI$—Y (where Y is a Lewis acid such as $P_2S_5B_2S_3.SiS_3$) achieves some of the above listed properties namely, 1, 2, 4 and 5, but is very brittle and totally lacks the desired rubbery or viscoelastic consistency. Examples of this type of electrolyte are described by Malugani et al. in U.S. Pat. No. 4,331,750 and by Akridge in U.S. Pat. No. 4,585,714.

The prior art salt-in-polymer approach mentioned above-satisfies three of the desiderata namely, 3, 4 and 5, but fails miserably with regard to desired properties 1 and 2. For instance, neither of two recent U.S. Patents dealing with salt-in-polymer electrolytes reported a room temperature conductivity greater than $10^{-5}$ S/cm for solvent-free or plasticizer-free systems (See: Kronfli et al., U.S. Pat. No. 5,009,970; Knight et al. U.S. Pat. No. 4,737,422). One prior art effort to rectify the poor conductivity of the salt-in-polymer electrolyte involved the addition of low molecular weight plasticizers (solvents) to the mixture (See: Koksbang et al. *J. Power Sources* 32, 175, (1990)). Improved conductivity was achieved, but at the expense of introducing unwanted volatile components into the electrolyte making the electrolyte susceptible to composition changes when it is exposed to the external atmosphere. Since the solubility of lithium salts in the polymer electrolytes is predicated upon attraction between the lithium cations and the solvating groups in the polymer, these electrolytes further suffer from the fact that the lithium is the less mobile cation. This means that the cation conductivity desideratum, identified as "2" above, is never achieved except in the poorly conducting, single mobile ion polymers which are described by Noda et al. in U.S. Pat. No. 4,844,995. It is believed that it is fundamentally unlikely that this problem can be rectified with the usual salt-in-polymer type of medium. Claims have been made that the problem can be somewhat reduced by using plasticized polymers, although no verification of these claims has been found. Exemplary salt-in-polymer type electrolytes are disclosed in U.S. Pat. Nos. 4,303,748; 4,357, 401; 4,585,714; and 5,009,970.

U.S. Pat. No. 4,234,667 of Bennion et al. discloses molten salt electrolytes of lithium chlorate or lithium perchlorate singly or in or in combination with lithium chloride and lithium oxide, as useful electrolytes in high temperature cells. Such electrolytes provide useful conductivities only in the range of 140–160° C., or higher. Owing to the very low ionic conductivities, battery cells comprising said electrolytes are essentially inoperable at temperatures below 140° C. and thus, can be stored for lengthy periods at room temperature without said cells suffering appreciable loss of effectiveness. Thus, said materials disclosed in U.S. Pat. No. 4,234,667 do not satisfy desideratum identified as #1 above.

Ambient temperature molten salt electrolytes containing Li salts are described by Cooper and Angell, *Solid State Ionics*, 9 & 10, 617 (1983), and by Takami et al., (Chem Abs 118: 195131d, Jpn. Kokai Tokkyo Koho JP 04,349,365 [92,349,365] CI. HOIM10/40.03 December 1992. Appl. 91/120,836. May 27, 1991: 4 pp). Neither of the latter electrolytes fall within the scope of the present application because they owe their high room temperature conductivities to the lowering of $T_g$ obtained by the inclusion of considerable mole fractions of non-lithium salts, namely, organic salts (tetraalkyl ammonium or otherwise-substituted ammonium salts). Inclusion of such organic salts destroys the decoupling of the $Li^+$ ion motion, hence leads to undesirably low $Li^+$ transport numbers.

Also, U.S. Pat. No. 4,164,610 discloses essentially silica-free glasses which have compositions within the $Li_2O$—$Al_2O_3$ and/or F—$B_2O_3$ system. These glasses exhibit high lithium ion mobility at 200° C. but low mobility at room temperature ($10^{-7.57}$ S/cm at best) according to Table II of U.S. Pat. No. 4,164,610.

As is apparent, a great need exists for the development of an improved electrolyte which obtains all of the desiderata listed above without the acquisition of unacceptable deleterious properties. While superionic glass electrolytes have been heretofore known to obtain various important properties such as high $Li^+$ conductivity, this so-called superionic glass electrolyte is brittle. Furthermore, the rubbery salt-in-polymer alternatives, which have sufficient resiliency to absorb electrolyte stress, suffer from being predominantly anion conductors. None of the known electrolytes achieves the unique combination of properties, so long desired but heretofore unobtainable, that is achieved by the present invention as is hereinafter described in detail.

Accordingly, a principal object of the present invention is to provide new and improved alkali metal ion conducting electrolytes that provide unexpectedly high conductivities both at room temperature and at 100° C.

Another object is to provide new and improved predominantly $Li^+$-conducting solvent-free viscous liquid electrolytes that provide conductivities of almost $10^{-2}$ S/cm at room temperature and almost $10^{-1}$ S/cm at 100° C.

Still another object of the present invention is to provide a new and improved solvent free alkali metal ion conducting electrolyte containing molten alkali metal salts and having a long-chain high molecular weight neutral or anionic polymer dissolved therein to provide a rubbery, non-brittle consistency to the electrolytes even at low temperatures without sacrificing the high conductivity obtained thereby.

SUMMARY OF THE INVENTION

The present invention relates to novel high-conductivity alkali-metal-ion containing electrolytes comprising viscous liquid or rubbery solid alkali metal salts which obtain conductivity by the dominate motion of cations ions which, when produced in accordance herewith, remain freely mobile at temperatures as low as −40° C.

One aspect of this invention relates to molten alkali metal salt electrolytes comprised of one or more alkali metal salt compositions which are substantially non-crystalline and have glass transition temperatures ($T_g$) below room temperature. Preferred embodiments are those wherein said glass transition temperature is below 0° C., and especially preferred are those wherein said glass transition temperature is below −40° C. Said liquid electrolytes provide high conductivities dominated by cation mobility and have properties superior in many ways to those of known non-aqueous $Li^+$ electrolytes in which $Li^+$ is not the dominate mobile species. Preferred in the practice of this invention are those electrolytes that have cation mobilities at least about 10 times greater than anion mobilities.

Illustrative of useful molten salts of the present invention are one or more alkali metal ion containing salts selected from the group consisting of MX, $MBX_4$, $MAlX_4$, $MAl_2X_7$, $MGaX_4$, $MInX_4$, $MPX_6$, $MAsX_6$, $MSbX_6$, $MFeX_4$, $MMoX_6$, and the like, wherein M is an alkali metal ion, and X is not always the same at each occurrence and is selected from the group consisting of $F^-$, $Cl^-$, $Br^-$, $I^-$, $CN^-$, $OCN^-$, $SCN^-$, $SeCN^-$, $NO_3^-$, $NO_2^-$, $ClO_4^-$, $ClO_3^-$, $BrO_4^-$, $BrO_3^-$, $IO_4^-$, $IO_3^-$, $CH_3CO_2^-$, $CF_3CO_2^-$, $CH_3SO_3^-$, $CF_3SO_3^-$, p-tolyl-$SO_3^-$, $CCl_3SO_3^-$, $CF_2ClCFClSO_3^-$,

and the like.

Electrolyte compositions of the present invention can be comprised of salts containing a single alkali metal ion and a mixture of anions. For example, a molten electrolyte useful in the practice of this invention can be prepared from a mixture of LiSCN, LiI, $LiNO_3$, and $LiClO_4$ that has a $T_g$ of −20° C. Also useful are electrolyte compositions comprised of a mixture of alkali-metal ions, such as mixtures containing lithium and sodium ions. For example, a useful electrolyte is comprised of NaI, LiSCN, $NaNO_3$, and $LiClO_4$.

Another aspect of the present invention relates to molten liquid electrolytes comprising one or more alkali metal salts to which has been added a Lewis acid. Illustrative of useful alkali metal salts are those selected from the group consisting of MX, $MBX_4$, $MAlX_4$, $MAl_2X_7$, $MGaX_4$, $MInX_4$, $MPX_6$, $MAsX_6$, $MSbX_6$, $MFeX_4$, $MMoX_6$, and the like, wherein M and X are as described above.

Illustrative of useful Lewis acids are $BY_3$, $AlY_3$, $Al_2Y_6$, $GaY_3$, $InY_3$, $FeY_3$, $MoY_5$, $PY_3$, $PY_5$, $AsY_3$, $AsY_5$, $SbY_3$, $SbY_5$, and the like, wherein Y is the same or different at each occurrence and is selected from the group consisting of F, Cl, Br, and I.

Another aspect of the present invention relates to the addition of low melting "solvate" compositions to said aforementioned alkali-metal electrolyte salts of the present invention. Useful solvate compositions are those of formula $AR_4X_2$ wherein A is a divalent alkaline earth metal such as $Mg^{++}$, $Be^{++}$, $Ca^{++}$, $Sr^{++}$, and $Ba^{++}$;

X is as described above; and

R is a solvating organic material that promotes non-crystalline behavior to such compositions. Illustrative of useful R compositions are small solvent molecules such as 1,2-dimethoxyethane, dimethyl sulfide, diethyl sulfide, acetonitrile, propionitrile, butyronitrile, and the like. Also useful R compositions are those of formula $NC-(CH_2)_n-CN$, where n is an integer ranging from 1 to 10. When four moles of these volatile low molecular weight materials are replaced with one mole of a less volatile tetradentate (or higher dentate) solvating ligand, problems relating to long-term liquid stability and compositional changes are overcome. Thus, when taken together, useful $R_4$ compositions are tetraglyme, pentaglyme, hexaglyme, low molecular weight polyethylene oxides, low molecular weight polypropylene oxides, 12-crown-4, 15-crown-5, 18-crown-6, dicyclohexyl-18-crown-6, and the like.

The amount of solvate salt of composition $AR_4X_2$ added to said molten alkali metal salt can vary widely and will depend on the desired molten temperature range and conductivity for the electrolyte system in hand. Typically electrolytes of the present invention containing 50 mol % alkali-metal salt and 50 mol % solvate salt are stable liquids at room temperature with conductivities as high as $10^{-4}$ S/cm and glass transition temperatures near −45° C.

It has been found that when molten liquid electrolytes of the present invention are supported on high surface area substrates, they retain their high conductivities. An advantage provided by the high surface area substrates is that they provide thixatropic properties to the liquid, thereby affording dimensional stability to the electrolyte. By the incorporation of said high surface area supports, paste and gel-type electrolytes can be fabricated. Illustrative of useful high surface area supports in the practice of this invention include fumed silicas, powdered aluminas, small particle size titanium dioxide, silica gels, high surface area ceramics, and the like. Useful paste and gel electrolyte compositions contain up to about 40 wt % high surface area support. Preferred are compositions containing up to 30 wt % support, and especially preferred are those containing up to about 20 wt % support.

Another aspect of the present invention relates to the dimensional stabilization of the above mentioned viscous liquid (molten) alkali-metal ion conducting electrolytes by the dissolution of a relatively small amount of a long-chain (high molecular weight) polymer which, by the normal chain entanglement phenomenon, bestows a rubbery consistency to the ionic liquid. Especially preferred polymers are alkali metal salts of anionic polymers which contribute alkali metal cations to the electrolyte without chelating or tying down any of the existing cations already present in the electrolyte. Thus, the aim of providing a predominantly cation-conducting electrolyte having exceptionally high conductivity at ambient temperature (measured as high as $10^{-2}$ S/cm at 25° C.) and capable of being obtained in a rubbery state is achieved and all of the five desiderata enumerated as goals for a new and valuable electrolyte are satisfied.

Polymers useful in the practice of this invention to produce rubbery electrolytes have molecular weights at least about 5,000. Preferred are polymers with molecular weights at least about 20,000, and especially preferred are those having molecular weights above 50,000.

An essential and distinct feature of the new rubbery material of this invention is the high content of electrolyte salts relative to polymer, referred to here as polymer-in-salt compositions. The preferred embodiment contains not less than 75 percent electrolyte salts, and not more than 25 percent polymer (based on mol percent of polymer repeat units). In some cases higher polymer contents (up to about 40 mol percent) have been used to lower the fusion temperatures of higher melting salt combinations. The high cation content is desirable to maximize the dominance of cation conduction in the material.

Suitable polymers for use in the preparation of the rubbery embodiments of the present invention are polypropylene oxide ("PPO") PAREL-58 obtained from HERCULES, INC.; polyethylene oxide, ("PEO") obtained from ALDRICH CHEMICAL CO.; poly(bis(methoxyethoxy)ethoxy) phosphazine ("MEEP"), obtained from ETHYL CORPORATION; and comparable commercially available polymers. Preferred polymers are anion containing polymers such as polyvinyl sulfonates, low molecular weight polyethylene glycol disulfonates, low molecular weight polyethylene glycol monomethyl ether sulfonates, low molecular weight polypropylene glycol disulfonates, low molecular weight polypropylene glycol monomethyl ether sulfonates, sulfonated polystyrene, polysulfonamides, sulfonated poly (methyl phenyl siloxanes), sulfonated polyimides, and the like.

In a preferred practice, a liquid lithium salt mixture, which may be supercooled at room temperature, is combined with a small mole fraction (circa 20 percent of ether oxygens) of a high molecular weight polypropylene oxide (or a functionally equivalent high molecular weight soluble polymer) which provides a rubbery consistency and which protects against crystallization of the salts. The preferred solid electrolyte of the present invention obtains a previously unheard of combination of properties, namely, (a) conductivity in the order of $10^{-2}$ S/cm at room temperature in the absence of polymer and approaches $10^{-3}$ S/cm at room temperature when modified as herein described by the dissolution of polymer in to the salt; (b) conduction by lithium cations in a manner which avoids or minimizes the problems heretofore endemic to the common lithium salts-in-polymer electrolyte solution systems; (c) a rubbery consistency which readily absorbs stress on the electrolyte; (d) good adhesion to metal electrodes; and (e) a wide electrochemical window. While one or more of the foregoing properties has been heretofore obtainable in some of the previously known electrolytes, no electrolyte has ever been developed which obtained all of these properties in a single system.

A preferred embodiment of the present invention obtains all of the desiderata listed above and further provides a predominantly cation-conducting viscous liquid electrolyte suitable for use in polymer sponge, conventional paste, or as solid electrolytes to obtain a conductivity which is an order of magnitude higher at room temperature than that obtainable with any previously known polymer-based electrolyte.

As will appear, the electrolyte of the present invention obtains an even greater conductivity advantage at temperatures above room temperature.

These and still further objects as shall hereinafter appear are readily fulfilled by the present invention in a remarkably unexpected manner as will be readily discerned from the following detailed description of preferred embodiment when read in conjunction with the accompanying drawing.

DETAILED DESCRIPTION OF THE INVENTION

Figure 1:
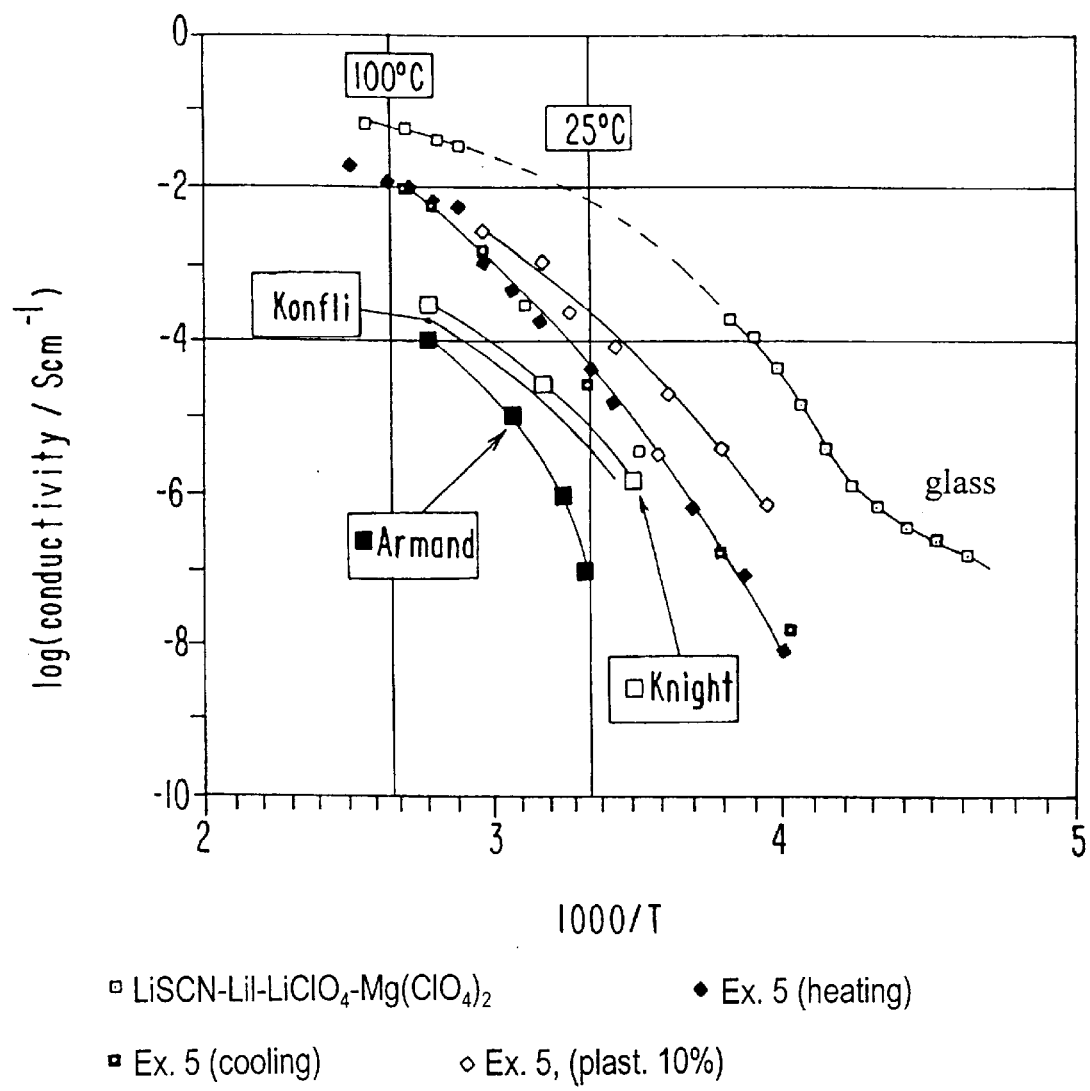
FIG. 1 is a diagram showing DC conductivity versus reciprocal absolute temperature for three related embodiments of the present invention and a comparison with prior art.

The high conductivity electrolytes of this invention comprise one or more alkali metal salts. In general the alkali metal salts useful in the practice of this invention are of the formulas MX, $MBX_4$, $MAlX_4$, $MAl_2X_7$, $MGaX_4$, $MInX_4$, $MPX_6$, $MAsX_6$, $MSbX_6$, $MFeX_4$, $MMoX_6$, and the like, wherein M is an alkali metal ion, and X is not always the same at each occurrence and is selected from the group consisting of $F^-$, $Cl^-$, $Br^-$, $I^-$, $CN^-$, $OCN^-$, $SCN^-$, $SeCN^-$, $NO_3^-$, $NO_2^-$, $ClO_4^-$, $ClO_3^-$, $BrO_4^-$, $BrO_3^-$, $IO_4^-$, $IO_3^-$, $CH_3CO_2^-$, $CF_3CO_2^-$, $CH_3SO_3^-$, $CF_3SO_3^-$, p-tolyl-$SO_3^-$, $(CF_3SO_2)_2N^-$, $CCl_3SO_3^-$, $CF_2ClCFClSO_3^-$,

and the like.

Preferred electrolytes are those comprised of mixtures of the above mentioned salts. Useful mixtures are those comprised of one type of alkali metal ion and various anions. For example, a mixture of lithium thiocyanate, lithium iodide, lithium nitrate, and lithium perchlorate can be heated until molten, then rapidly cooled to give a non-crystalline molten liquid electrolyte with a glass transition temperature as low as −20° C.

Other salt mixtures useful as electrolytes in the practice of this invention are those comprised of mixtures of alkali metals. Preferred are those comprised of lithium and sodium salt mixtures. The components in said mixtures can vary widely and depend on the desired properties of conductivity and glass transition temperature. Illustrative of useful mixtures are those comprising NaI, LiSCN, NaBr, LiBr, LiClO$_4$, and NaNO$_3$. This mixture is not to be construed as limiting, as other mixtures with the same or different alkali metals are anticipated.

The salts used in preparing the electrolytes of the present invention can be mostly reagent grade chemicals obtained from companies such as ALPHA, ALDRICH, and like major suppliers. In some cases they may require further purification. Anhydrous salts are preferred. Among the suitable lithium salts which are useful in the practice of the present invention are, for example, the thiocyanate, iodide, bromide, chloride, nitrate, perchlorate, acetate, tetrafluoroborate, haloaluminate, such as tetrachloroaluminate, halodialuminate such as hexachlorobromodialuminate, thiohalodialuminate, such as hexachlorothiodialuminate. The haloaluminates, and halothioaluminates are prepared from available alkali metal salts and aluminum halides. Trifluoromethane sulfonates and trifluoromethane sulfonimides are available from 3M. In compositions containing LiSCN, the partially hydrated salts can be used when dried under vacuum at temperatures in the vicinity of 150° C. Great care is needed in the case of LiSCN to avoid decomposition when the water content approaches zero. Removal of water can be aided by the addition of acetonitrile or acetone which, in addition, are also found to aid with subsequent additions of high molecular weight polymer. It should be noted that care should always be exercised when heating any dehydrated thiocyanate in the presence of an oxidizer. Water should be removed from such compositions in the presence of excess acetone which, in turn, should be removed at low temperatures, that is, temperatures not exceeding 120° C.

Another embodiment of the present invention relates to non-crystalline electrolyte salts made by the addition of Lewis acids to alkali metal salts. Although we do not wish to be bound by any theory, it is believed that the Lewis acids combine with the Lewis base anions, X$^-$, to form a melt which is very resistant to crystallization at room temperature and below. Preferred compositions of this type are those that remain liquid to temperatures as low as 25° C. Particularly preferred are those that remain liquid at temperatures as low as 0° C., and especially preferred are those that remain liquid at −40° C.

Illustrative of useful electrolytes comprised of alkali metal salts and Lewis acids are those comprised of one or more salts of formula MX, MBX$_4$, MAlX$_4$, MAl$_2$X$_7$, MGaX$_4$, MInX$_4$, MPX$_6$, MAsX$_6$, MSbX$_6$, MFeX$_4$, MMoX$_6$, and the like, wherein M and X are as described above; mixed with a Lewis acid of the type BY$_3$, AlY$_3$, Al$_2$Y$_6$, GaY$_3$, InY$_3$, FeY$_3$, MoY$_5$, PY$_3$, PY$_5$, AsY$_3$, AsY$_5$, SbY$_3$, SbY$_5$, and the like, wherein Y is the same or different at each occurrence and is selected from F, Cl, Br, and I.

As an example of this type of electrolyte useful in the practice of the present invention to produce a room temperature Li$^+$-conducting liquid electrolyte, the salts LiBr (0.355 g), LiClO$_4$ (0.24 g) and AlCl$_3$ (0.55 g) were admixed in a dry-box and melted in a closed vessel at 120° C. In this practice, the strong Lewis acid, AlCl$_3$ combines with the Lewis bases Br$^-$ and ClO$_4^-$ to form a melt which is very resistant to crystallization at room temperature; and which is permanently stable as a liquid above 80° C. The conductivity of this melt is a remarkable 10$^{-1.2}$ S/cm at 100° C. and 10$^{-2.2}$ S/cm at room temperature (See FIG. 2). Even higher conductivities are obtained at temperatures down to 60° C. by using LiCl in place of LiBr in the above mixture. High conductivity at low temperature can be obtained using the above described procedure when one part of AlCl$_3$ is mixed with one part of LiI to give the compound LiAlCl$_3$I of generalized stoichiometry LiAlX$_4$ (where X symbolizes a halide). This substance melts at 80° C., has a conductivity of 10$^{-1.1}$ S/cm at 100° C. and a conductivity 10$^{-1.4}$ S/cm at 60° C. (supercooled).

Another embodiment of the present invention relates to the addition of solvate compositions to the above mentioned electrolytes. Illustrative of useful solvate compositions are those of general formula AR$_4$X$_2$. Useful A groups are divalent alkaline earth metals such as Be$^{++}$, Mg$^{++}$, Ca$^{++}$, Sr$^{++}$, and Ba$^{++}$. Illustrative of useful R compositions are 1,2-dimethoxyethane, dimethyl sulfide, diethyl sulfide, acetonitrile, propionitrile, butyronitrile, and compositions of formula NC—(CH$_2$)$_n$—CN, where n is an integer ranging from 1 to 10; and the like. Also useful R compositions are those, when taken together can be represented as R$_4$, such as tetraglyme, pentaglyme, hexaglyme, low molecular weight polyethylene oxides, low molecular weight polypropylene oxides, 12-crown-4, 15-crown-5, 18-crown-6, dicyclohexyl-18-crown-6, and the like.

Preferred electrolyte compositions are those containing between 5 mol % and 65 mol % solvate compounds. More preferred are compositions that contain between 20 wt % and 50 wt %, and especially preferred are those containing between 40 mol % and 55 mol % solvate compounds.

For example, the introduction of the "solvate" compound, Mg(CH$_3$CN)(ClO$_4$)$_2$, a compound having a melting point of only 90° C., acts like a low-melting alkali-metal salt and promotes glassforming properties on mixtures of lithium salts. For instance, when a mixture of 0.973 g Mg(CH$_3$CN)$_4$(ClO$_4$)$_2$ with 0.536 g LiClO$_4$ and 0.425 g of LiNO$_3$ is fused at 100° C. in a capped vessel, a liquid is obtained which is very resistant to crystallization. The conductivity of this melt was 10$^{-4.5}$ S/cm and it provides a glass transition temperature of about −25° C. Solutions containing about 50 mol percent Li salts and 50 mol percent of the solvate salt are stable liquids at room temperature and have conductivities near 10$^{-4.4}$ S/cm and Tg near −45° C. This practice, and analogous practices in which the four moles of CH$_3$CN are replaced by one mole of the less volatile tetraglyme TG (which is involatile when in contact with Mg$^{2+}$)provides long term liquid stability and overcomes the problem of room temperature crystallization for this type of liquid.

Another embodiment of the present invention relates to the use of high surface area solid supports for the electrolytes of this invention. Useful solid supports are those with effective surface areas, as determined by the B.E.T. method, of at least 0.1 m$^2$/g. Particularly useful are those with surface areas greater than about 1 m$^2$/g, and especially preferred are those with surface areas greater than about 10 m$^2$/g. Illustrative of useful solid supports are fumed silicas, aluminas, titanium dioxide, silica gels, high surface area ceramics and the like. A paste or gel electrolyte can be made by mixing about two parts of the molten salt with one part of a high surface area substrate, which provides conductivities of at least about 10$^{-4}$ S/cm at room temperature.

Yet another embodiment of the present invention relates to dimensionally stable rubbery (viscoelastic) electrolytes prepared by the dissolution of a high molecular Weight polymer into the aforementioned molten liquid electrolytes of the present invention. Illustrative of useful polymers in the practice of the invention are polypropylene oxides, polyethylene oxides, poly(bis(methoxyethoxy)ethoxy) phosphazine; alkali metal salts of low molecular weight polyethylene glycol disulfonates, low molecular weight polyethylene glycol monomethyl ether sulfonates, low molecular weight polypropylene glycol disulfonates, low molecular weight polypropylene glycol monomethyl ether sulfonates, sulfonated polystyrene, sulfonated poly(methyl phenyl siloxanes), polysulfonamides, polysulfonimides, sulfonated polyimides, and the like. The amount of polymer used to provide dimensional stability may vary widely depending on the nature of the electrolyte, the nature of the polymer and the properties desired. Preferred compositions are those containing up to about 40 mol % polymer, based on polymer repeat units. Particularly preferred are those containing up to 25 mol % polymer, and especially preferred are those containing up to 10 mol % polymer.

Exemplary in the practice of the present invention to produce an ionic rubber, 1.50 g $LiClO_4$, 1.29 g LiSCN, 4.30 g LiI, 0.43 g LiBr, and 1.15 g $Mg(ClO_4)_2$, as well as 0.99 g PPO (high MW) can be dissolved in acetone to yield a syrupy solution. The acetone and any residual water introduced with incompletely dried LiSCN are thereafter removed by a combination of heating and vacuum evaporation, taking care not to exceed 100° C. (the removal of water and acetone can be confirmed by weight). This procedure provides a rubbery electrolyte containing 80 mol percent lithium salts with a conductivity of $10^{-4.5}$ S/cm at room temperature and greater than $10^{-2}$ S/cm at 100° C. No rubbery electrolyte has been previously reported to have a higher conductivity at 100° C. and, in addition, this conductivity is $Li^+$-dominated. The ionic rubber is stable against crystallization since the same conductivity was obtained during slow heating as during slow cooling (see FIG. 1). Without the polymer addition, the quaternary salt supercooled liquid and glass ($T_g$ about -25° C.) has a conductivity two orders of magnitude higher than the rubber at -20° C. (see FIG. 1) but then crystallizes at a higher temperature. An increase of the polymer content up to about 30 percent appears to add further stability to the rubber, but decreases the conductivity at both high and low temperatures. The optimum combination of salt components and polymer for stability and high conductivity can be determined by the artisan using the present teaching. Because of the high concentration of lithium salts, the last part of the acetone used in the preparation procedure is very difficult to remove; (its thermodynamic activity coefficient appears to be less than 0.03 so it behaves like a liquid with normal boiling point about 200° C.). If some acetone is deliberately allowed to remain in the rubber, it acts as a plasticizer to lower the glass transition temperature to bestow increased conductivity. For instance a rubber having the composition described above which contained a residual 0.2 g acetone (equivalent to 0.10 mol percent), exhibited conductivity better than $10^{-4}$ S/cm as shown in FIG. 1. Data from two recent patents (U.S. Pat. No. 5,009,970, Kronfli et al, and U.S. Pat. No. 4,737,422, Knight et al) relating to the traditional type of salt-in-polymer rubber electrolyte, and from the original Armand Patent (U.S. Pat. No. 4,303,748), are included for comparison.

This latter practice allows small mole fractions of high molecular weight polymer to be readily dissolved in the electrolyte and provides rubbery materials as before. The rubbers in this practice, however, have improved flexibility. For instance, the conductivity of a rubber of the composition 24[$Mg(ClO_4$).2TG].76[55LiSCN-45LiI] containing ten mol percent of high molecular weight PPO repeat units is found to be $10^{-5.3}$ S/cm. Both of these figures are competitive with the best unplasticized polymer salt electrolytes heretofore known.

Exemplary in the practice of the present invention to produce a room temperature $Li^+$ conducting liquid electrolyte suitable for use in filled porous polymer, or paste, types of battery electrolyte, a single low melting lithuim salt, such as $LiClO_3$, is mixed with a small mole fraction of polyvinyl sulfonate lithium, less than 15 mol % repeat units, or one of the salts polyethylene glycol disulfonate lithium or polyethylene glycol monomethyl ether sulfonate lithium, about 6 mol %, to enhance its resistance to crystallization. This simple two component system will then serve as a highly conducting room temperature liquid electrolyte in which the current is carried predominantly by the $Li^+$ cation. In this practice of the invention it is not necessary that the polyvinyl sulfonate polymer be of very high molecular weight, but that it be high enough to render the electrolyte incapable of crystallizing.

Also exemplary in the practice of this invention, a rubbery electrolyte in which the high conductivity is dominated by the $Li^+$ cation motion is obtained by incorporating a larger mole fraction, greater than 15 mole % repeat units, of the polyvinyl sulfonate lithium of very high molecular weight, such that entanglement of the polymer chains occurs. Alternatively, a lower molecular weight polymer in which dilute cross linking has been introduced to bestow rubbery elasticity, may be utilized. Crosslinks are easily introduced by adding some divinyl lithium sulfonate to the polymerizing solution, or by other standard methods. A single lithium salt of low melting character such as $LiClO_3$ may be used. However, in a preferred practice, a binary or multicomponent mixture of low melting lithium salts is used to maximize the resistance to crystallization or even render the melt thermodynamically stable under conditions of application. Under conditions of elevated temperature application, many of these newly invented rubbery solid $Li^+$-conducting electrolytes will be thermodynamically stable, and this may be their preferred domain of application since their conductivities may then be extremely high and greater even than those of aqueous solutions of lithium salts.

Figure 5:
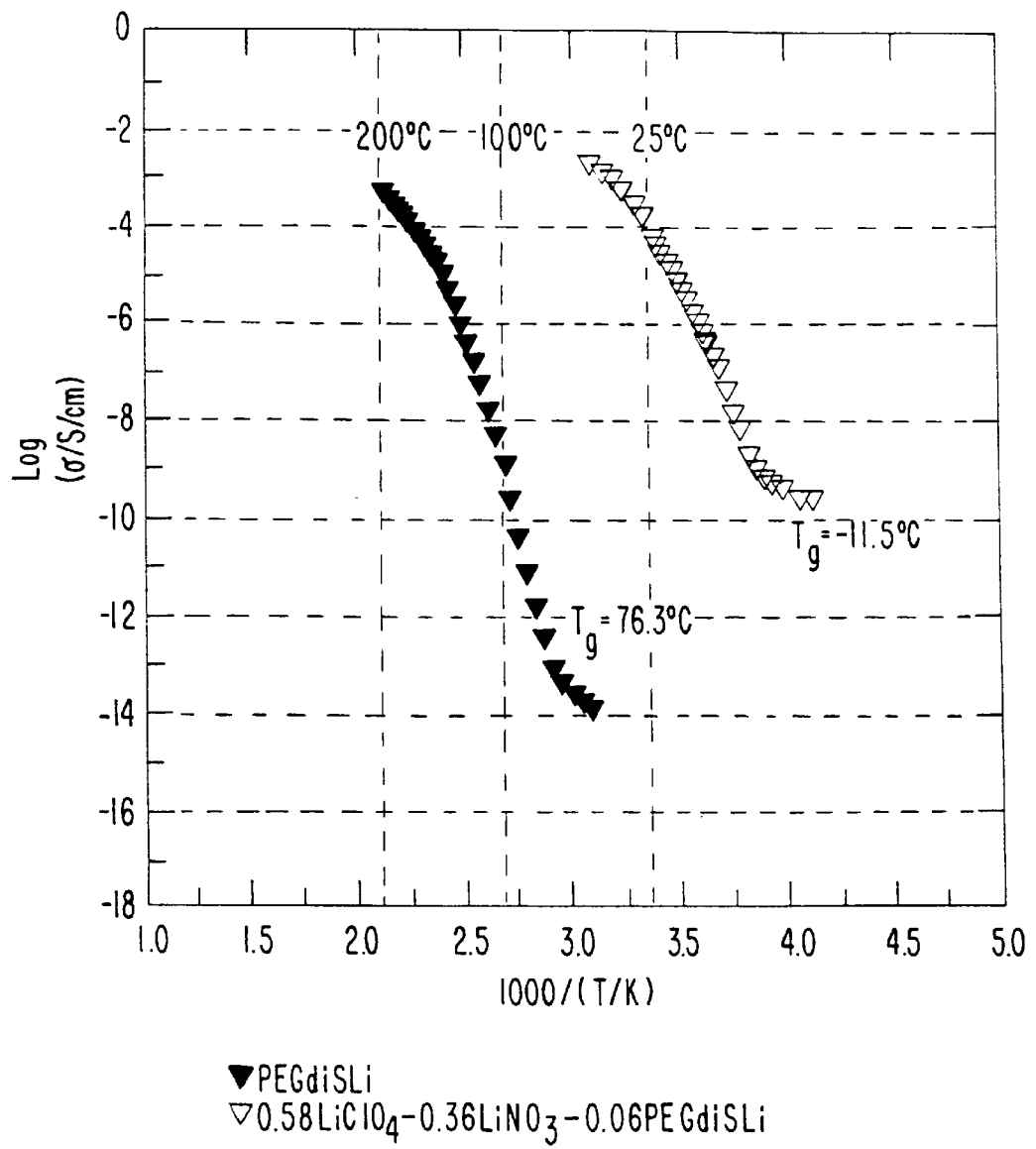
FIG. 5 is a diagram showing conductivity versus reciprocal absolute temperature for the embodiment of the present invention using polyethylene glycol disulfonate lithium (PEGdiSLi) as the polymer added to the salt mixture 58% $LiClO_4$ plus 36% $LiNO_3$ to repress crystallization and yield a room temperature conductivity of $10^{-4}$ S/cm.
Figure 6:
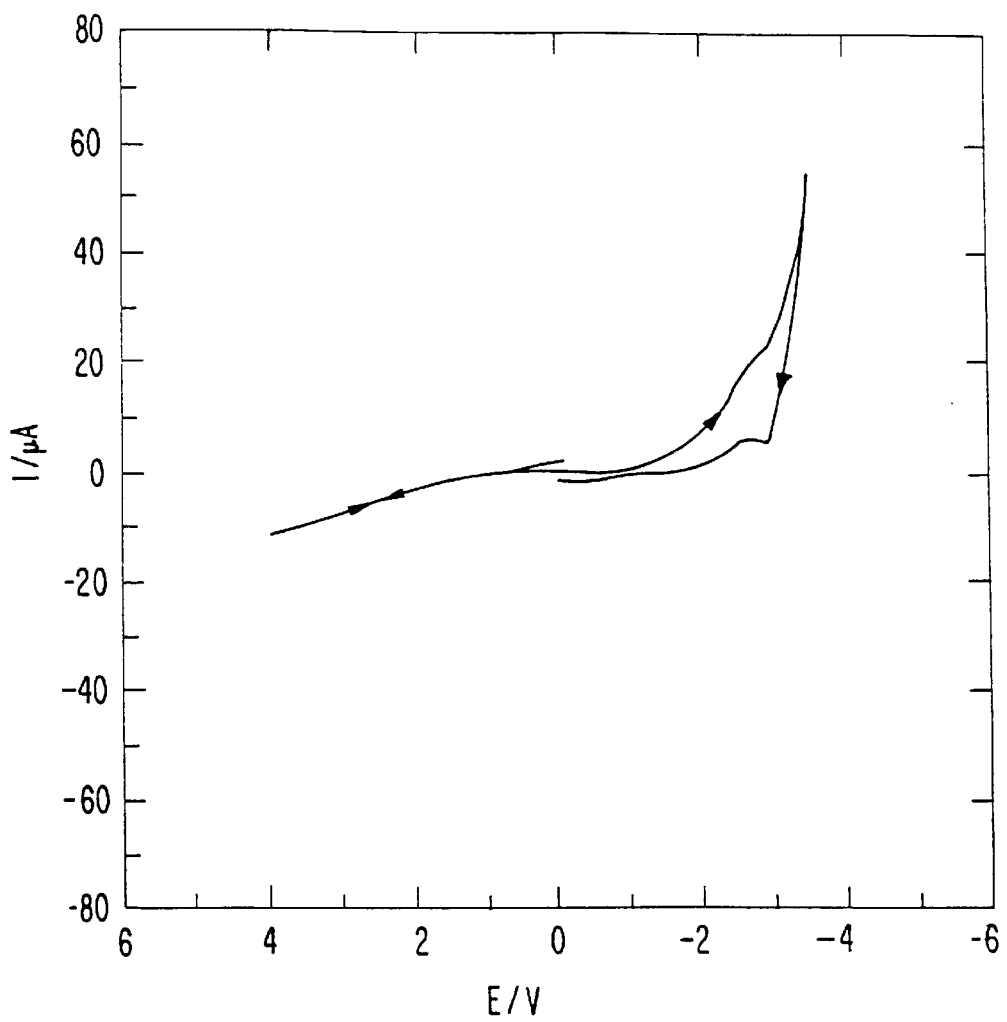
FIG. 6 is a cyclic voltammogram showing the relation between d.c. current in the microampere range flowing in the electrolyte in response to d.c. voltage applied in the way of a back and forth sweep using a three platinum electrode configuration, and indicating a 4 volt stability range.
Figure 7:
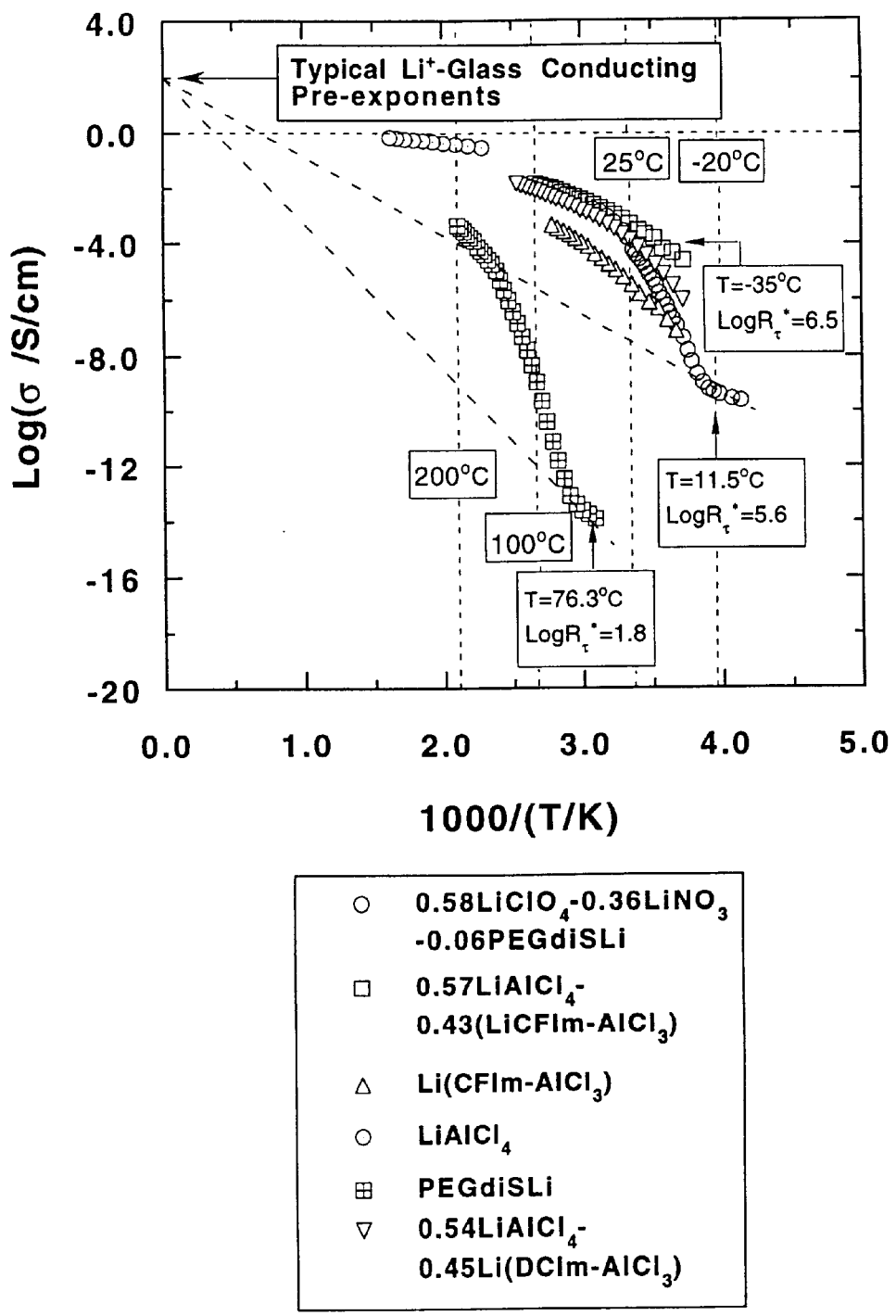
FIG. 7 shows plots of the temperature behavior of imide-based molten salts in comparison with other systems and a single melt $LiAlCl_4$.

The conductivities of liquid, supercooled liquid, and rubbery electrolytes prepared in accordance with the present invention are illustrated in Examples 1, 7, 9, 10, 16, 17, and 18. The conductivities of the same salt composition in polymer-free, rubberized, and plasticized rubber states using the particular salt composition described in Example 5 (and used also in Example 13), are shown as a function of reciprocal absolute temperature in FIG. 1. Electrolytes prepared by the other examples reported herein are similarly charted in FIGS. 2, 3, 4, 5, and 7. Several are compared with the best results obtained from the prior art practices. The legend on each drawing identifies the example number or the essential components of the electrolyte plotted. The plots identified with surnames identify the inventors of the U.S. Patent in which the reported material was first disclosed. The highest-conducting $LiClO_4$ solution in low molecular weight PPO (4000) is also included for comparison. FIG. 6 demonstrates the wide electrochemical stability window for typical electrolytes of the present invention. FIG. 7 compares the temperature behavior for several electrolyte compositons of the present invention (CFIm stands for chlorofluoroimide).

To further aid in the understanding of the present invention and not by way of limitation, the following examples are presented.

EXAMPLE 1

Impedances and capacitances of the rubbery and supercooled liquids prepared in the present invention were determined using a variety of different cells of cell constants chosen to suit the conductivity range in question. Ionic conductivities were determined automatically using a HEWLETT-PACKARD Model HP4192AFrequency Analyzer. The initial study was conducted using an allmetal two electrode cell of cell constant about 0.02 cm$^{-1}$ which had been used extensively in previous research for measurements of conductivity in the range from $10^{-8}$ to $10^{-3}$ S/cm. Measurements were automated to cover a predetermined temperature range at a sequence of temperatures controlled to ±0.1° C. by a EUROTHERM temperature controller. Conductivities were obtained from complex impedance plots in the standard manner. For higher temperature work where the conductivity of the system approaches $10^{-1}$ S/cm, cells of larger cell constant were used. Cells of simple design requiring only small volumes of material were constructed using projecting platinum wire electrodes in a standard conductivity cell arrangement. These cells had cell constants in the range 0.5 to 2 cm$^{-1}$.

As an initial study, a glass-forming mixture of lithium thiocyanate (LiSCN), lithium iodide (LiI), lithium nitrate (LiNO$_3$), and lithium Perchlorate (LiClO$_4$) was prepared by mixing the salts in the quantities 0.323 g LiSCN, 0.227 g LiI, 0.307 g LiNO$_3$, 0.402 g LiClO$_4$ and heating the mixture in a glass vessel placed on a hot plate to about 120° C. The heated mixture is then quenched to a glassy state in liquid nitrogen. The quenched material is then stable and can be studied at temperatures up to 5° C. in a conductivity cell. A Perkin Elmer differential scanning calorimeter (DSC-4) was used to measure the glass transition temperature, Tg, which was −20° C. Above 5° C., crystallization slowly occurred, but had this not occurred, an ambient temperature conductivity approaching $10^{-2}$ S/cm would have been realized.

EXAMPLE 2

A glass-forming mixture containing four lithium salts (LiSCN, LiClO$_4$, Li acetate[LiOAc] and LiI) was prepared by mixing 1.57 g LiI, 1.17 g LiOAc, 1.55 g LiClO$_4$ and 3.85 g LiSCN and melting as above, and the salt mixed with 0.25 g of high molecular weight polypropylene oxide. To facilitate dissolution, acetonitrile was added as a molecular solvent. When a homogeneous solution was obtained, the solvent was removed by evaporation under vacuum at temperatures increasing from about 40° C. to about 120° C. A rubbery, transparent solid with Tg of −17° C. was obtained having a slight brownish color resulting from traces of free iodine. The conductivity of the rapidly cooled rubber was circa $2 \times 10^{-4}$ S/cm at room temperature which is superior to any conductivity known for a rubbery solid electrolyte to which no plasticizers have been added.

EXAMPLE 3

The composition of Example 2 was simplified to contain only LiSCN and LiClO$_4$ in order to gain maximum conductivity at high temperatures. The rubber prepared by mixing 2.42 g LiSCN and 2.86 g LiClO$_4$ with 0.143 g of high molecular weight PPO according to the procedure of Example 2, has an excellent high temperature conductivity, $10^{-1.7}$ S/cm at 100° C. while retaining excellent stable rubber characteristics. Even though partly crystalline at room temperature, this system gave conductivity of $10^{-5}$ S/cm

EXAMPLE 4

A rubbery electrolyte was made using the procedure of Example 2 with 3.417 g Mg(ClO$_4$)$_2$, 3.5 g LiClO$_4$ and 1.9 g PEO (MW 10$^5$). This simple ionic rubber electrolyte has very good rubbery properties and adhesion to metal at temperatures of 90° C. and above, and conductivity at 100° C. of $10^{-1.9}$ S/cm.

EXAMPLE 5

Figure 2:
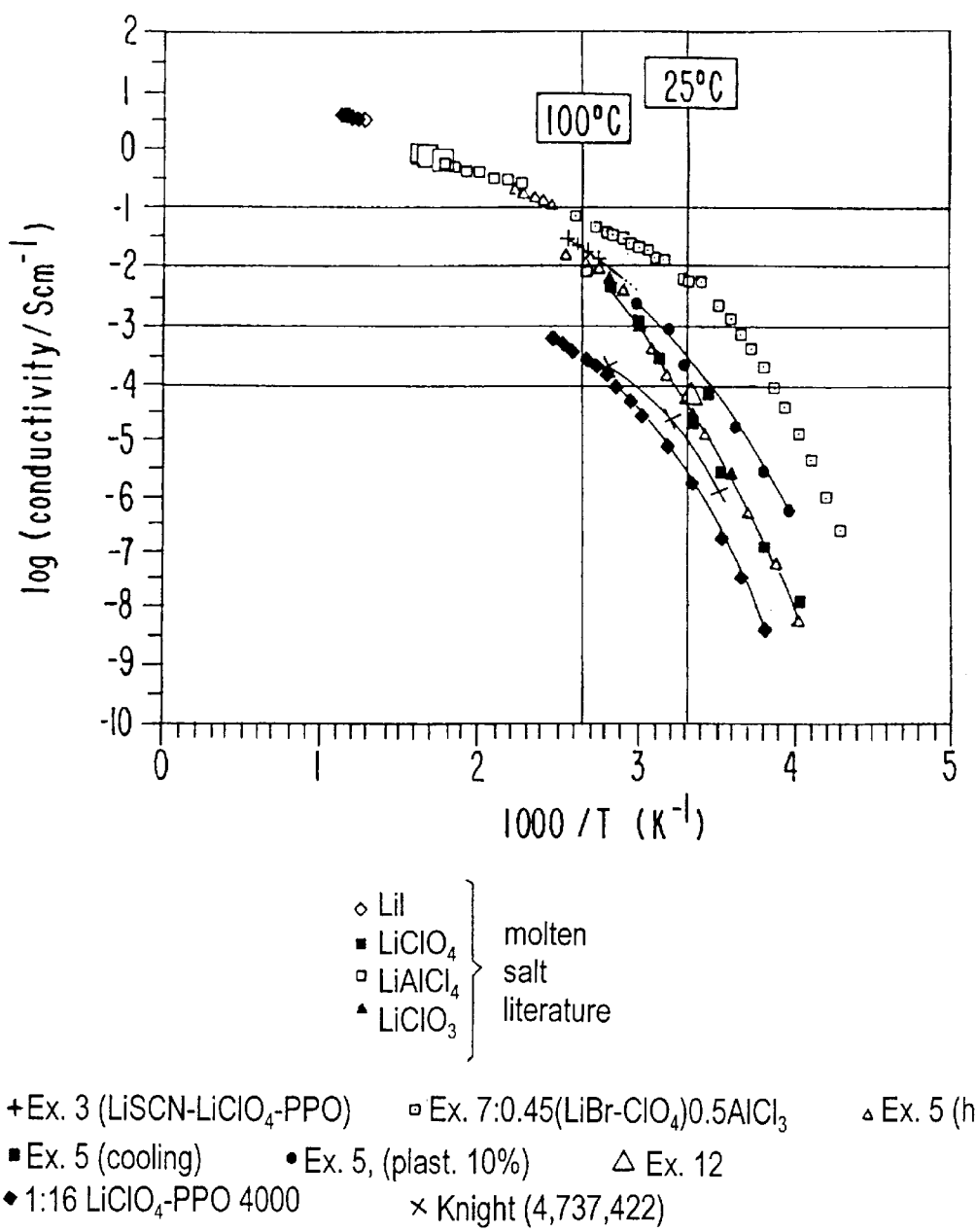
FIG. 2 is a like diagram for other embodiments of the present invention and the prior art.

A multicomponent mixture having good resistance to crystallization, good conductivity and excellent rubber characteristics was prepared. In this preparation 4.30 g LiI, 0.43 g LiBr, 1.79 g LiSCN, 1.50 g LiClO$_4$, 1.15 g Mg(ClO$_4$)$_2$ and 0.99 g high molecular weight PPO are dissolved in acetone to yield a syrupy solution. The acetone and residual water (introduced with incompletely dried LiSCN) is then removed by a combination of heating and vacuum evaporation taking care not exceed 120° C. The removal of water and acetone is confirmed by weighing. This procedure produced a rubbery electrolyte containing 80 mol percent lithium salts with a conductivity of about $10^{-1.9}$ S/cm at 100° C. On cooling to room temperature, the conductivity was about $10^{-4.5}$ S/cm. No previously reported rubbery electrolyte has a higher 100° C. conductivity and, in addition, the present conductivity is Li-dominated. The ionic rubber is stable against crystallization since the same conductivity was obtained during slow heating as during slow cooling as shown in FIGS. 1 and 2.

EXAMPLE 6

An example using fluorinated anion salts of lithium was prepared by mixing 0.876 g LiBF$_4$, 0.70 g LiSO$_3$CF$_3$ and 0.4 g PEO (MW 10$^5$) and heating using acetone as solvent. The product after removal of 100 percent of acetone was partly crystalline, but had a conductivity of about $10^{-4}$ S/cm at 20° C. Major improvements of this performance may be expected when new fluorinated anions, such as lithium perfluoromethanesulfonimide and (CF$_3$SO$_2$)$_3$C$^-$ are introduced.

EXAMPLE 7

To provide a lower glass transition temperature for liquid electrolytes, aluminum chloride (AlCl$_3$) was added to a LiBr and LiClO$_4$ mixture prior to melting. This provided a melt composition (in mole fraction) of 0.45 (LiBr—LiClO$_4$): 0.55 AlCl$_3$. The melt which was made by admixing 0.355 g LiBr, 0.24 g LiClO$_4$, and 0.55 g AlCl$_3$, in a dry box and melting in a closed vessel, is very resistant to crystallization (Tg=−41° C.) and exhibits a room temperature conductivity of $6 \times 10^{-3}$ S/cm and 100° C. conductivity of $10^{-1.2}$ S/cm. These conductivities exceed those of any currently available salt-in-polymer or fast ion-conducting glass electrolyte. Data between 100° C. and −60° C. for this electrolyte are shown in FIG. 2. This melt composition is not fully compatible with high molecular weight polyethylene oxide giving a sponge rather than rubber when PEO (MW 10$^5$) is incorporated into the system (using acetone as facilitator solvent) at less than 60 percent and blackening if temperature rises much above 60° C., during solvent removal. The conductivity of the sponge, however, remains high. The system is therefore presented as a superior Li$^+$ conducting liquid electrolyte. It is preferred, when an aluminum salt is used in the salt mixture, to use poly[bis(methoxyethoxy)ethoxy)-phosphazine] (MEEP) as the polymer of choice to produce a stable rubbery solid electrolyte having a conductivity exceeding $10^{-4}$ S/cm.

EXAMPLE 8

To obtain an improved low-melting high $Li^+$-conducting liquid of simple tetrahaloaluminate stoichiometry, a melt containing 50/50 LiI:AlCl$_3$ was prepared according to the procedure of Example 7. This liquid, which is thermodynamically stable at 80° C., has a conductivity of $10^{-1.2}$ S/cm at 100° C., low AlCl$_3$ volatility, and relatively low hydroscopicity. At 80° C., the conductivity is $10^{-1.3}$ S/cm. It is an excellent low temperature, predominantly $Li^+$ conducting, solvent-free electrolyte, but has no ability to supercool to room temperature.

EXAMPLE 9

A mixture containing 0.75 mole fraction of aluminum chloride and 0.25 mole fraction of lithium perfluoromethanesulfonimide (LiN(CF$_3$SO$_2$)$_2$ was heated and cooled to room temperature. The liquid was stable for prolonged periods of time at 25° C. and the system obtained a conductivity of $10^{-3.5}$ S/cm. A glass forming mixture containing 0.75 mole fraction of lithium perfluoromethanesulfonimide and 0.25 mole fraction of Li triflate (trifluoromethane sulfonate) on the other hand obtained a conductivity of only $10^{-7}$ S/cm at 25° C.

EXAMPLE 10

Using the procedure of Example 7, a mixture consisting of 0.63 g LiClO$_4$ and 1.96 g AlCl$_3$, was melted and cooled. The conductivity at room temperature was $1.5 \times 10^{-3}$ S/cm. When the weight of aluminum chloride was reduced to 1.37 g, (thus 63.5 mol percent AlCl$_3$) the conductivity at room temperature rose to $3.3 \times 10^{-3}$ S/cm. The glass transition temperature of this liquid was determined to be −44° C.

EXAMPLE 11

By mixing 0.973 g of Mg(CH$_3$CN)$_4$(ClO4)$_2$, a solvate compound, with 0.536 g LiClO$_4$ and 0.425 g of LiNO$_3$, and fusing the mixture at 100° C. in a capped vessel, a liquid which is very resistant to crystallization and which appears to be thermodynamically stable at room temperature is obtained. The conductivity of this melt is found to be $10^{-4.5}$ S/cm at room temperature, and it has a glass transition temperature of about −25° C. Solutions with less than 50 mol percent Li salts are stable as liquids at 25° C., and their conductivities are comparable because their $T_g$'s are lower. This example provides a demonstration of one manner in which long term stability against crystallization in this type of system can be obtained, although CH$_3$CN remains somewhat volatile. This problem is addressed, by replacing the CH$_3$CN molecules by a single chelating molecule, in Example 12.

EXAMPLE 12

A liquid containing chelated $Mg^{++}$ ions as one component is prepared as follows: (anhydrous) Mg(ClO$_4$)$_2$ and tetraglyme (TG) are mixed in 1:1 proportions and dissolved in acetone. Vacuum evaporation is then used to quantitatively remove the acetone. The liquid Mg(ClO$_4$)$_2$-TG is stable at room temperature indefinitely and has a $T_g$. of 30° C. 3.578 g of Mg(ClO$_4$)$_2$-TG is then mixed with 0.305 g LiSCN and 0.517 g LiI (the latter two being in the binary eutectic proportions) and heated with acetone solvent to dissolve. On removing the acetone, a stable liquid is obtained, in which tetraglyme remains bound to the $Mg^{2+}$. Its conductivity at 25° C. is $10^{-4.5}$ S/cm, and its glass transition temperature is about −25° C. The more salt-rich case 79[Mg(ClO$_4$)$_2$-TG] .21[55LiSCN.45LiI] is also stable at room temperature and forms a good rubber when 10 percent PPO is added using the procedure of Example 2. The conductivity was $10^{-5.3}$ S/cm at 25° C.

EXAMPLE 13

The material of Example 5 is modified by the addition of 0.2 g of acetone (amounting to 0.10 mol percent acetone) and heating in a closed tube to 100° C. for sufficient time for the acetone to diffuse through the entire rubber. This leads to a significant increase in conductivity, presumably due to a lowering of the glass transition temperature because the increase is most pronounced at low temperature. At 25° C. the volatility of the acetone is very low. The conductivity of the modified material is $10^{-3.7}$ S/cm at room temperature.

EXAMPLE 14

Polyvinyl sulfonate lithium was synthesized in this laboratory by dissolving vinyl sulfonate lithium (synthesized in a similar manner to that of corresponding sodium salt as described by G. C. H. Stone, J. Am. Chem. Soc. 1936, 58, 488; and U.S. Pat. No. 3,022,172) in water and polymerizing with a radical initiator as follows: an aqueous solution of 10 grams of monomer vinylsulfonate lithium and 1 mol % of initiator K$_2$S$_2$O$_8$ in ca. 100 mL water was degassed and flashed with nitrogen repeatedly. Then it was sealed under nitrogen atmosphere and polymerization was carried out at 60–70° C. for several hours until viscous precipitation occurred. The resultant polymer was then repeatedly dissolved with water and precipitated with methanol a few times to get the high molecular weight fraction, which was dried under vacuum. The yield based on monomer used was approximately 40%. The molecular weight determined by intrinsic viscosity measurements was about 300,000. To create the electrolytes, dry salts were added and the mixtures melted and held in a vacuum oven at 120° C. at 0.5 torr for several days to remove all traces of water.

EXAMPLE 15

Polyethylene glycol disulfonate lithium was prepared as follows: 44.45 grams (0.22 mol) of polyethylene glycol of average molecular weight 200 and 39.55 g (0.5 mol) of pyridine in dry CHCl$_3$ was added dropwise to 60.34 g (0.5 mol) of SOCl$_2$ at 0–5° C. under violent stirring. After the addition was completed, the reaction mixture was refluxed for 3 hours and cooled to room temperature. Water was carefully added and then organic phase was separated and washed with water to neutral. After being filtered and dried over anhydrous CaCl$_2$, the solvent was removed under vacuum to yield 38.33 grams (0.16 mol) of α,ω-dichloro ethylene glycol.

32.59 g (0.137 mol) of the above dichloride was added dropwise to 300 mL boiling aqueous solution of 44.43 g (0.35 mol) of Na$_2$SO$_3$. The reaction mixture was refluxed for 24 hours until no phase separation was visible. Water was then evaporated to dryness and the residual white solid was extracted with MeOH. Evaporation of MeOH gave 45.00 g (0.121 mol) sodium sulfonate salt of the polymer. 20.00 g (0.054 mol) of this salt was dissolved in 150 mL of water and acidified by passing through an $H^+$ ion exchange column, and the resultant acidic solution was neutralized with excess LiCO_3. After being evaporated to dryness, MeOH extraction was done which gave 18.34 g (0.052 mol) of the lithium salt of average molecular weight 340 as a light brown glassy material. Polyethylene glycol monomethyl ether monosulfonate lithium was prepared similarly.

EXAMPLE 16

To obtain a liquid electrolyte which is $Li^+$ conducting but which contains only a single lithium salt in combination with the anionic polymer, 1.092 g of $LiClO_3$ was combined with 0.164 g of polyvinyl sulfonate lithium (from example 14) to produce a melt of conductivity $10^{-4.5}$S/cm at room temperature and $10^{-1.7}$ S/cm at 100° C.

EXAMPLE 17

Figure 3:
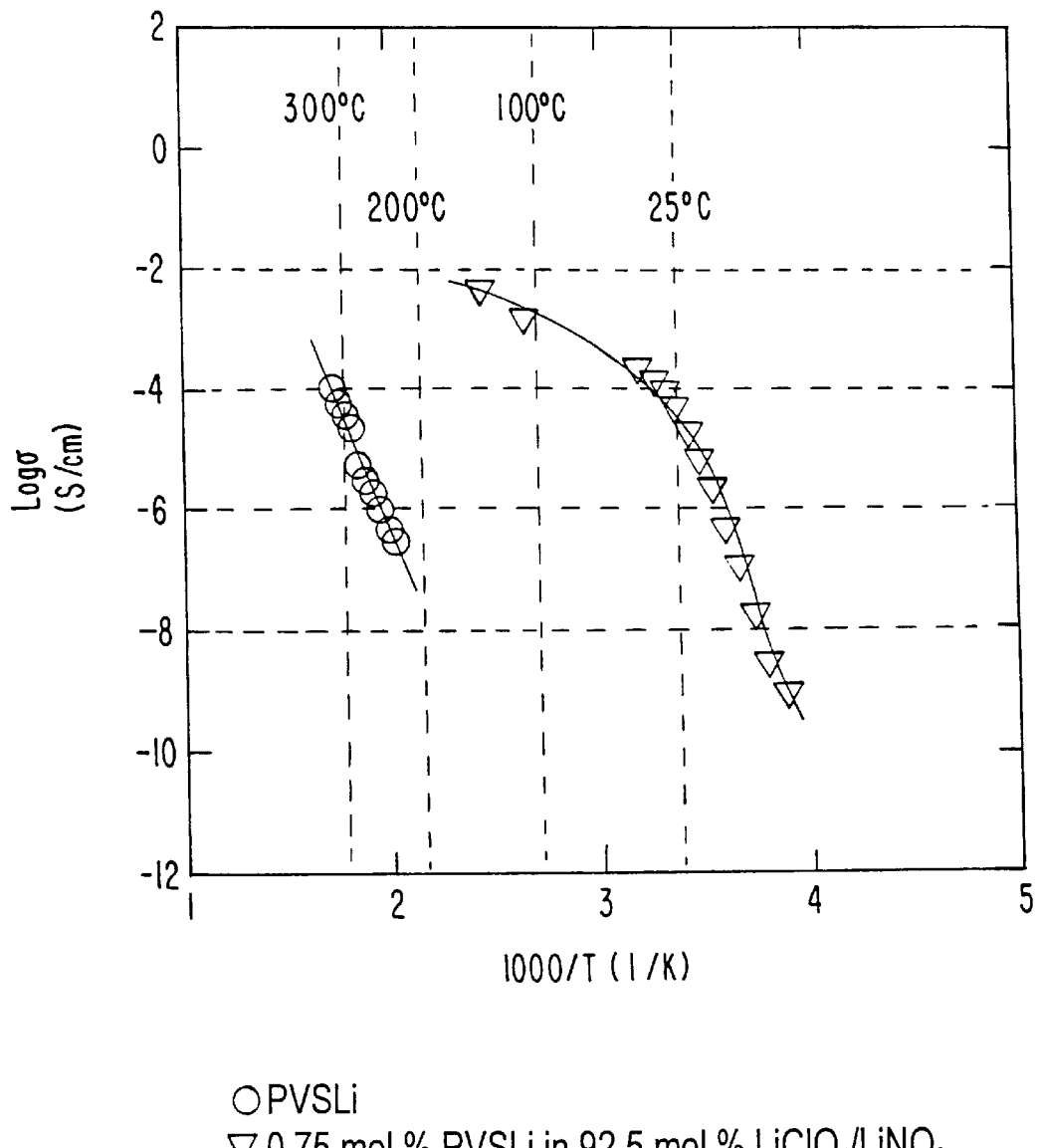
FIG. 3 is a diagram showing DC conductivity versus reciprocal absolute temperature for pure polyvinyl sulfonate lithium (PVSLi) and the corresponding polymer-in-salt composition of this invention (PVSLi, $LiClO_4$, $LiNO_3$).
Figure 4:
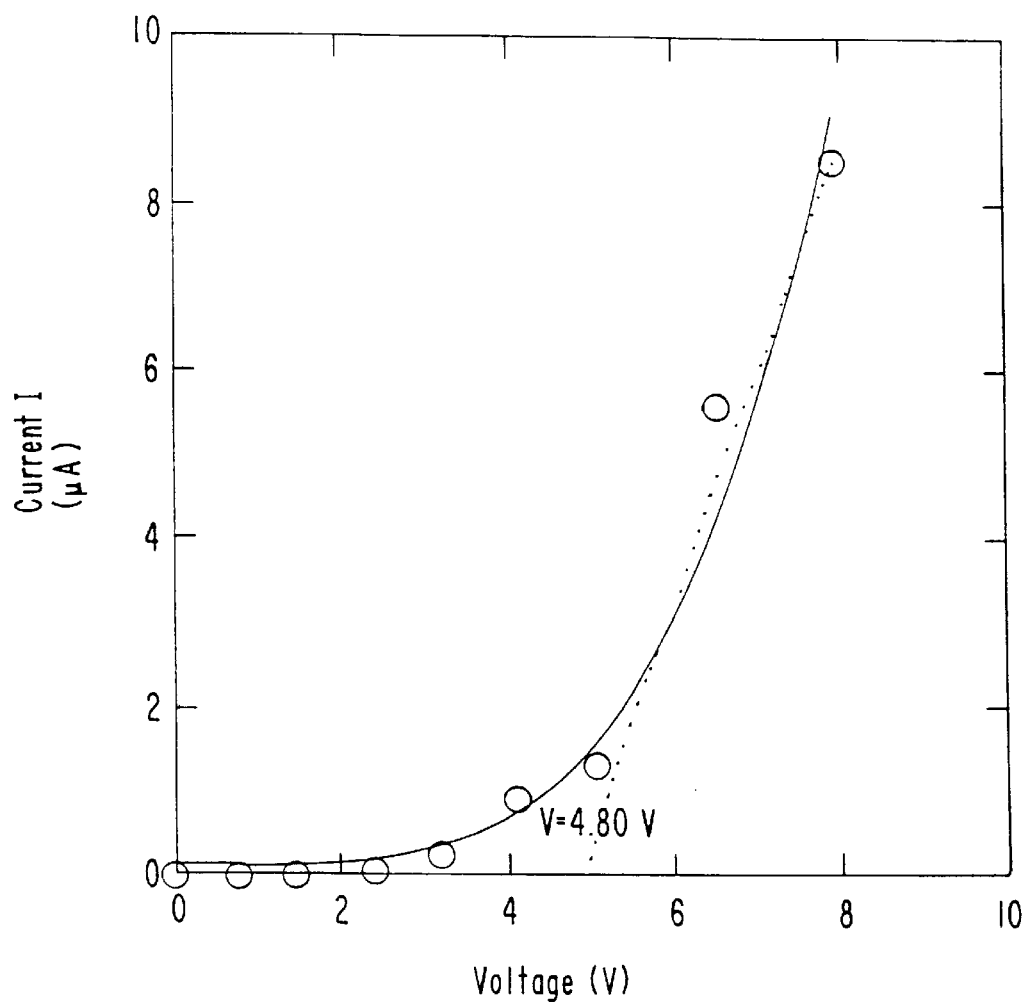
FIG. 4 is a diagram showing the relation between d.c. current in the 1–10 microampere range flowing in a polymer-in-salt electrolyte (PVSLi, $LiClO_4$, $LiNO_3$) in response to d.c. voltage applied between twin platinum electrodes.

To improve the stability against crystallization of an electrolyte like that in Example 16, $LiClO_3$ (0.664 g), $LiClO_4$ (0.280 g), and polyvinyl sulfonate lithium from Example 14 (0.056 g) were admixed and heated at 120° C. under vacuum (0.5 torr) for two days. The resultant material is a viscous liquid at room temperature which is stable against crystallization for many days. It has a $T_g$ of about 0° C. and a room temperature conductivity of $10^{-3}$ S/cm. The variation of conductivity with temperature is shown in FIG. 3. The conductivity at the temperature of structural arrest at –3° C. is $10^{-6.5}$ S/cm, which implies the highest degree of conductivity/structure decoupling yet seen in this new type of electrolyte. High decoupling implies dominance of transport by $Li^+$ ions, hence is a good characteristic.

EXAMPLE 18

Accurately weighed lithium salts and polyethylene glycol disulfonate lithium (PEGdiSLi) were admixed and heated at 140–160° C. under vacuum for a few hours. The resultant liquid was naturally cooled down to room temperature to obtain the supercooled liquid. A typical example involved 1.51 g (0.0142 mol) $LiClO_4$, 0.61 g (0.0084 mol) $LiNO_3$ and 0.5 g (0.0015 mol) polyethylene glycol disulfonate lithium. The resultant molten salt 0.58 $LiClO_4$—0.36 $LiNO_3$—0.06 PEGdiSLi is brown and viscous at room temperature. Its conductivity behavior with temperature is shown in FIG. 5.

EXAMPLE 19

A sodium ion conducting chlorothiocyanoaluminate room temperature electrolyte was prepared by careful dry-mixing 0.81 g of NaSCN and 3.11 g of $AlCl_3$ under dry-box conditions. The powdered mixture undergoes a strong exothermic reaction at room temperature; as the reaction progressed, a light beige slurry or paste was formed. The slurry was then heated to 150° C. at a rate of about 0.7 to 1° C./min at which point the slurry became molten and light yellow-brown in color. This remained liquid on cooling to room temperature over a long period of time. The conductivity of this material is about $1.6 \times 10^{-4}$ S/cm at room temperature and about $1.2 \times 10^{-2}$ S/cm at 100° C. It exhibited a $T_g$ of –20° C. and an electrochemically inert window of 4.0 volts vs $Li/Li^+$.

EXAMPLE 20

This example discribes new lithium imides and their chloroaluminate electrolytes. Dichloroimidic acid (HDClm) was prepared according to M. Becke-Goehring, and E. Fluck, *Inorg. Synth,* 8, 105 (1966). 45.7 g of HDClm (0.21 mol) in 200 mL of methylene chloride was added dropwise to 2.50 g of LiH (0.32 mol) suspended in 100 mL of dry ether, and then the mixture was filtered to remove exess LiH. The filtrate was dried at 120° C. under 2 mmHg vacuum to remove residual ether, and 44.0 g of dichloroimidic acid lithium salt (LiDClm, 0.20 mol) was obtained, which is slighlty yellow glassy material, $T_g$ 40° C. 1.00 g of LiDClm was mixed with 0.61 g of $AlCl_3$ and 0.61 g of $LiAlCl_4$. The mixture became brown fluid in a sealed vial upon heating up to 80–100° C. This liquid shows a $T_g$ of –20° C. It exhibits a room temperature conductivity of $10^{-3.8}$ S/cm and an electrochemically inert window of 5 volts vs. $Li/Li^+$.

Accordingly, what is claimed is:

1. An alkali-cation conducting liquid electrolyte having a conductivity equal to or greater than about $10^{-4}$ S/cm at a temperature of 100° C. or lower, said liquid electrolyte comprising:
   (i) one or more alkali-metal-ion containing salts selected from the group consisting of: MX, $MBX_4$, $MAlX_4$, $MAl_2X_7$, $MGaX_4$, $MPX_6$, $MAsX_6$, $MSbX_6$, $MFeX_4$, and $MMoX_6$; wherein:
   M is an alkali metal ion; and,
   X is the same or different at each occurrence and is an anion selected from the group consisting of: $F^-$, $CN^-$, $NCO^-$, $SeCN^-$, $NO_2^-$, $ClO_3^-$, $BrO_4^-$, $BrO_3^-$, $IO_4^-$, $IO_3^-$, $CF_3CO_2^-$, $CH_3SO_3^-$, p-tolyl-$SO_3^-$, $CCl_3SO_3^-$, $CF_2ClCFClSO_3^-$,

$(SO_2Cl)_2 N^-$, $(SO_2F)_2N^-$, $(POCL_2)_2N^-$, $(POF_2)_2N^-$ and $(CF_3SO_2)_3C^-$; and,
   (ii) a solvate composition of formula $AR_4X_2$; wherein:
   A is a divalent alkaline earth metal ion;
   R is one or more solvating organic compounds selected from the group consisting of: 1,2-dimethoxy ethane; dimethyl sulfide; diethyl sulfide; acetonitrile; propionitrile; butyronitrile; and compounds of formula NC—$(CH_2)_n$—CN, where n is an integer ranging from 1 to 10; or,
   $R_4$, when taken together, is one or more organic compounds selected from the group consisting of: tetraglyme; pentaglyme; hexaglyme; low molecular weight polyethylene oxides; low molecular weight polypropylene oxides; 12-crown-4 ether; 15-crown-5 ether; 18-crown-6 ether; dicyclohexyl-18-crown-6 ether; and,
   X is the same or different at each occurrence and is an anion selected from the group consisting of: $F^-$, $Cl^-$, $Br^-$, $I^-$, $CN^-$, $OCN^-$, $SCN^-$, $SeCN^-$, $NO_3^-$, $NO_2^-$, $ClO_4^-$, $ClO_3^-$, $BrO_4^-$, $BrO_3^-$, $IO_4^-$, $IO_3^-$, $CH_3CO_2^-$, $CF_3CO_2^-$, $CH_3SO_3^-$, $CF_3SO_3^-$, p-tolyl-$SO_3^-$, $(CF_3SO_2)_2N^-$, $CCl_3SO_3^-$, $CF_2ClCFClSO_3^-$,

$N(SO_2Cl)_2^-$ and fluorine-substituted analogs, and $N(POCl_2)_2^-$ and fluorine-substituted analogs.

2. The liquid electrolyte according to claim 1, wherein said liquid electrolyte is substantially non-crystalline and non-glassy at temperatures as low as 25° C.

3. The liquid electrolyte according to claim 1, wherein said liquid electrolyte is substantially non-crystalline and non-glassy at temperatures as low as 0° C.

4. The liquid electrolyte according to claim 1, wherein said liquid electrolyte is substantially non-crystalline and non-glassy at temperatures as low as –20° C.

5. The liquid electrolyte according to claim 1, wherein said alkali metal ion is lithium ion.

6. The liquid electrolyte according to claim 1, wherein said alkali metal ion is sodium ion.

7. The liquid electrolyte according to claim 1, wherein said alkali metal ion is a mixture of alkali-metal ions.

8. The liquid electrolyte according to claim 1, wherein said alkali metal ion is a mixture of lithium ions and sodium ions.

9. The liquid electrolyte according to claim 1, wherein said alkaline earth metal ion is a magnesium ion.

10. The liquid electrolyte according to claim 1, wherein said liquid electrolyte comprises from mole 5 mol % to 65 mol % of said solvate.

11. The liquid electrolyte according to claim 1, wherein said liquid electrolyte comprises from mole 40 mol % to 55 mol % of said solvate.

12. The liquid electrolyte according to claim 1, wherein said liquid electrolyte is supported on a high surface area support, wherein said high surface area support has a surface area of at least about 0.1 m$^2$/g.

13. The liquid electrolyte according to claim 12, wherein said high surface area support is comprised of one or more materials selected from the group consisting of: fumed silicas; aluminas; titanium dioxides; silica gels; and high surface area ceramics.

14. The liquid electrolyte according to claim 1, further comprising a high molecular weight polymer which is soluble in said liquid electrolyte, to form a rubbery electrolyte having a conductivity of at least about 10$^{-5}$ S/cm at 25° C. and at least about 10$^{-3}$ S/cm at 100° C.

15. The rubbery electrolyte according to claim 14, said rubbery electrolyte comprising at least about 60 weight percent of alkali-metal ion salt, and not more than about 40 weight percent of said high molecular weight polymer.

16. The rubbery electrolyte according to claim 14, wherein said high molecular weight polymer comprises one or more cation-solvating polymers or networks of cation-solvating polymers selected from the group consisting of: polypropylene oxides; polyethylene oxides; poly(bis(methoxyethoxy)ethoxy)phosphazenes; and ethylene oxide grafted polysiloxanes.

17. The rubbery electrolyte according to claim 14, wherein said high molecular weight polymer is one or more anionic cation-neutralized polymers selected from the group consisting of: polyvinyl sulfonates; sulfonated polystyrenes; sulfonated polysiloxanes; polysulfonamides; polysulfonimides; and sulfonated polyimides.

18. The rubbery electrolyte according to claim 14, wherein said rubbery electrolyte is substantially non-crystalline and non-glassy at temperatures as low as 25° C.

19. The rubbery electrolyte according to claim 14, wherein said rubbery electrolyte is substantially non-crystalline and non-glassy at temperatures as low as 0° C.

20. The rubbery electrolyte according to claim 14, wherein said rubbery electrolyte is substantially non-crystalline and non-glassy at temperatures as low as −20° C.

21. An alkali-cation conducting liquid electrolyte having a conductivity equal to or greater than about 10$^{-4}$ S/cm at a temperature of 100° C. or lower, said liquid electrolyte comprising:
(i) two or more alkali-metal-ion containing salts selected from the group consisting of: MX, MBX$_4$, MAlX$_4$, MAl$_2$X$_7$, MGaX$_4$, MInX$_4$, MPX$_6$, MAsX$_6$, MSbX$_6$, MFeX$_4$, and MMoX$_6$; wherein:
M is an alkali metal ion other than lithium ion; and,
X is the same or different at each occurrence and is an anion selected from the group consisting of: Cl$^-$, Br$^-$, I$^-$, SCN$^-$, NO$_3^-$, ClO$_4^-$, CH$_3$CO$_2^-$, CF$_3$SO$_3^-$, (CF$_3$SO$_2$)$_2$N$^-$; and,
(ii) a solvate composition of formula AR$_4$X$_2$; wherein:
A is a divalent alkaline earth metal ion;
R is one or more solvating organic compounds selected from the group consisting of: 1,2-dimethoxy ethane; dimethyl sulfide; diethyl sulfide; acetonitrile; propionitrile; butyronitrile; and compounds of formula NC—(CH$_2$)$_n$—CN, where n is an integer ranging from 1 to 10; or,
R$_4$, when taken together, is one or more organic compounds selected from the group consisting of: tetraglyme; pentaglyme; hexaglyme; low molecular weight polyethylene oxides; low molecular weight polypropylene oxides; 12-crown-4 ether; 15-crown-5 ether; 18-crown-6 ether; dicyclohexyl-18-crown-6 ether; and,
X is the same or different at each occurrence and is an anion selected from the group consisting of: F$^-$, Cl$^-$, Br$^-$, I$^-$, CN$^-$, OCN$^-$, SCN$^-$, SeCN$^-$, NO$_3^-$, NO$_2^-$, ClO$_4^-$, ClO$_3^-$, BrO$_4^-$, BrO$_3^-$, IO$_4^-$, IO$_3^-$, CH$_3$CO$_2^-$, CF$_3$CO$_2^-$, CH$_3$SO$_3^-$, CF$_3$SO$_3^-$, p-tolyl-SO$_3^-$, (CF$_3$SO$_2$)$_2$N$^-$, CCl$_3$SO$_3^-$, CF$_2$ClCFClSO$_3^-$,

N(SO$_2$Cl)$_2^-$ and fluorine-substituted analogs, and N(POCl$_2$)$_2^-$ and fluorine-substituted analogs.

22. The liquid electrolyte according to claim 21, wherein said liquid electrolyte is substantially non-crystalline and non-glassy at temperatures as low as 25° C.

23. The liquid electrolyte according to claim 21, wherein said liquid electrolyte is substantially non-crystalline and non-glassy at temperatures as low as 0° C.

24. The liquid electrolyte according to claim 21, wherein said liquid electrolyte is substantially non-crystalline and non-glassy at temperatures as low as −20° C.

25. The liquid electrolyte according to claim 21, wherein said alkali metal ion is sodium ion.

26. The liquid electrolyte according to claim 21, wherein said alkali metal ion is a mixture of alkali metal ions.

27. The liquid electrolyte according to claim 21, wherein said alkaline earth metal ion is a magnesium ion.

28. The liquid electrolyte according to claim 21, wherein said liquid electrolyte comprises from mole 5 mol % to 65 mol % of said solvate.

29. The liquid electrolyte according to claim 21, wherein said liquid electrolyte comprises from mole 40 mol % to 55 mol % of said solvate.

30. The liquid electrolyte according to claim 21, wherein said liquid electrolyte is supported on a high surface area support, wherein said high surface area support has a surface area of at least about 0.1 m$^2$/g.

31. The liquid electrolyte according to claim 30, wherein said high surface area support is comprised of one or more materials selected from the group consisting of: fumed silicas; aluminas; titanium dioxides; silica gels; and high surface area ceramics.

32. The liquid electrolyte according to claim 21, further comprising a high molecular weight polymer which is soluble in said liquid electrolyte, to provide a rubbery electrolyte having a conductivity of at least about 10$^{-5}$ S/cm at 25° C. and at least about 10$^{-3}$ S/cm at 100° C.

33. The rubbery electrolyte according to claim 32, said rubbery electrolyte comprising at least about 60 weight percent of alkali-metal ion salt, and not more than about 40 weight percent of said high molecular weight polymer.

34. The rubbery electrolyte according to claim 32, wherein said high molecular weight polymer comprises one or more cation-solvating polymers or networks of cation-solvating polymers selected from the group consisting of: polypropylene oxides; polyethylene oxides; poly(bis (methoxyethoxy)ethoxy)phosphazenes; and ethylene oxide grafted polysiloxanes.

35. The rubbery electrolyte according to claim 32, wherein said high molecular weight polymer comprises one or more anionic cation-neutralized polymers selected from the group consisting of: polyvinyl sulfonates; sulfonated polystyrenes; sulfonated polysiloxanes; polysulfonamides; polysulfonimides; and sulfonated polyimides.

36. The rubbery electrolyte according to claim 32, wherein said rubbery electrolyte is substantially non-crystalline and non-glassy at temperatures as low as 25° C.

37. The rubbery electrolyte according to claim 32, wherein said rubbery electrolyte is substantially non-crystalline and non-glassy at temperatures as low as 0° C.

38. The rubbery electrolyte according to claim 32, wherein said rubbery electrolyte is substantially non-crystalline and non-glassy at temperatures as low as −20° C.

* * * * *

UNITED STATES PATENT AND TRADEMARK OFFICE

CERTIFICATE OF CORRECTION

PATENT NO. : 5,962,169

DATED : October 5, 1999

INVENTOR(S) : Charles Austen ANGELL et al.

It is certified that error appears in the above-identified patent and that said Letters Patent is hereby corrected as shown below:

In column 16, line 19, after "MGaX$_4$," please insert --MInX$_4$,--;

In column 16, in the chemical equation after line 26, please replace "NO$_2$CF$_2$CF$_2$CF$_2$CF$_2$SO$_2$," with --NSO$_2$CF$_2$CF$_2$CF$_2$CF$_2$SO$_2$,--;

In column 16, in the chemical equation on line 55, please replace "NO$_2$CF$_2$CF$_2$CF$_2$CF$_2$SO$_2$," with --NSO$_2$CF$_2$CF$_2$CF$_2$CF$_2$SO$_2$,--;

In column 18, in the chemical equation after line 23, please replace "NO$_2$CF$_2$CF$_2$CF$_2$CF$_2$SO$_2$," with --NSO$_2$CF$_2$CF$_2$CF$_2$CF$_2$SO$_2$,--

Signed and Sealed this

Twelfth Day of September, 2000

Attest:

Q. TODD DICKINSON

*Attesting Officer*     *Director of Patents and Trademarks*